US012406654B2

(12) United States Patent
Wang et al.

(10) Patent No.: US 12,406,654 B2
(45) Date of Patent: Sep. 2, 2025

(54) METHOD, ELECTRONIC DEVICE, AND COMPUTER PROGRAM PRODUCT FOR DATA PROCESSING

(71) Applicant: Dell Products L.P., Round Rock, TX (US)

(72) Inventors: Zijia Wang, Weifang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 316 days.

(21) Appl. No.: 18/110,611

(22) Filed: Feb. 16, 2023

(65) Prior Publication Data

US 2024/0242705 A1 Jul. 18, 2024

(30) Foreign Application Priority Data

Jan. 18, 2023 (CN) ........................ 202310097502.X

(51) Int. Cl.
*G10L 13/047* (2013.01)
*G10L 13/033* (2013.01)
(Continued)

(52) U.S. Cl.
CPC ........ *G10L 13/047* (2013.01); *G10L 13/0335* (2013.01); *G10L 13/10* (2013.01); *G10L 25/18* (2013.01); *G10L 2013/105* (2013.01)

(58) Field of Classification Search
CPC ............... G10L 13/047; G10L 13/0335; G10L 2013/105; G10L 13/02; G10L 13/04;
(Continued)

(56) References Cited

U.S. PATENT DOCUMENTS

2019/0341025 A1* 11/2019 Omote .................... G10L 25/30
2021/0342656 A1* 11/2021 Mittal .................. G06V 10/806

OTHER PUBLICATIONS

Ren, Yi, et al. "Fastspeech 2: Fast and high-quality end-to-end text to speech." arXiv preprint arXiv:2006.04558 (2020). (Year: 2020).*
(Continued)

*Primary Examiner* — Bhavesh M Mehta
*Assistant Examiner* — Jangwoen Lee
(74) *Attorney, Agent, or Firm* — Ryan, Mason & Lewis, LLP

(57) ABSTRACT

A method in an illustrative embodiment includes determining a first loss function for a first sub-model of a speech generation model based on a plurality of feature vectors associated with training image information, training audio information, and training text information used to train the speech generation model. The method may further include determining a second loss function for a second sub-model and a third loss function for a third sub-model of the speech generation model based on the plurality of feature vectors that have been processed. In addition, the method may further include determining a fourth loss function for a fourth sub-model of the speech generation model based on the processed plurality of feature vectors. The method may further include updating parameters of the speech generation model based on the first loss function, the second loss function, the third loss function, and the fourth loss function.

20 Claims, 4 Drawing Sheets

(51) Int. Cl.
*G10L 13/10* (2013.01)
*G10L 25/18* (2013.01)

(58) Field of Classification Search
CPC ......... G10L 13/08; G10L 13/10; G10L 25/18; G10L 25/24; G10L 25/63; G10L 21/028; G10L 15/02; G10L 17/02; G10L 17/04
See application file for complete search history.

(56) References Cited

OTHER PUBLICATIONS

Liu, Xuefeng, et al. "CP Decomposition and Its Application in Noise Reduction and Multiple Sources Identification." 2015 International Conference on Computer Science and Intelligent Communication. Atlantis Press, 2015. (Year: 2015).*
Zadeh, Amir, et al. "Tensor fusion network for multimodal sentiment analysis." arXiv preprint arXiv:1707.07250 (2017). (Year: 2017).*
Xue, Haiwei, et al. "Multi-tensor fusion network with hybrid attention for multimodal sentiment analysis." 2020 International Conference on Machine Learning and Cybernetics (ICMLC). IEEE, 2020. (Year: 2020).*
J. Liu et al., "OPT: Omni-Perception Pre-Trainer for Cross-Modal Understanding and Generation," arXiv:2107.00249v2, Jul. 6, 2021, 10 pages.
Y. Ren et al., "FastSpeech 2: Fast and High-Quality End-to-End Text to Speech," arXiv:2006.04558v8, Aug. 8, 2022, 15 pages.

* cited by examiner

METHOD, ELECTRONIC DEVICE, AND COMPUTER PROGRAM PRODUCT FOR DATA PROCESSING

RELATED APPLICATION

The present application claims priority to Chinese Patent Application No. 202310097502.X, filed Jan. 18, 2023, and entitled "Method, Electronic Device, and Computer Program Product for Data Processing," which is incorporated by reference herein in its entirety.

FIELD

Embodiments of the present disclosure relate to the field of computers, and more particularly, to a method, an electronic device, and a computer program product for data processing.

BACKGROUND

Speech cloning techniques of intelligently generating speech that matches reference speech and corresponds to given text based on the given text and the reference speech are the key to research in many fields. Therefore, the speech cloning techniques have a wide range of application scenarios in many fields. Conventional speech cloning techniques only focus on how to convert input text into speech data with timbre shown in reference speech, without considering factors such as emotions in the generated speech data. In other words, it is easy for a user to distinguish speech generated based on the conventional speech cloning techniques from realistic speech with a corresponding timbre. In fact, what is more desirable is that artificially intelligent speech and real human speech can be switched seamlessly.

SUMMARY

Embodiments of the present disclosure provide a solution for data processing.

In a first aspect of the present disclosure, a method for data processing is provided. The method may include determining a first loss function for a first sub-model of a speech generation model based on a plurality of feature vectors associated with training image information, training audio information, and training text information used to train the speech generation model, the first sub-model being configured to process the plurality of feature vectors to predict duration of phonemes in speech. The method may further include determining a second loss function for a second sub-model and a third loss function for a third sub-model of the speech generation model based on the plurality of feature vectors that have been processed, the second sub-model and the third sub-model being configured to process the plurality of feature vectors processed by the first sub-model to predict pitch contour and sound volume of the speech, respectively. In addition, the method may further include determining a fourth loss function for a fourth sub-model of the speech generation model based on the processed plurality of feature vectors, the fourth sub-model being configured to determine acoustic spectrum data of the speech based at least on the plurality of feature vectors processed respectively by the second sub-model and the third sub-model. The method may further include updating parameters of the speech generation model based on the first loss function, the second loss function, the third loss function, and the fourth loss function.

In a second aspect of the present disclosure, an electronic device is provided, including: a processor; and a memory coupled to the processor and having instructions stored therein which, when executed by the processor, cause the electronic device to perform actions including: determining a first loss function for a first sub-model of a speech generation model based on a plurality of feature vectors associated with training image information, training audio information, and training text information used to train the speech generation model, the first sub-model being configured to process the plurality of feature vectors to predict duration of phonemes in speech; determining a second loss function for a second sub-model and a third loss function for a third sub-model of the speech generation model based on the plurality of feature vectors that have been processed, the second sub-model and the third sub-model being configured to process the plurality of feature vectors processed by the first sub-model to predict pitch contour and sound volume of the speech, respectively; determining a fourth loss function for a fourth sub-model of the speech generation model based on the processed plurality of feature vectors, the fourth sub-model being configured to determine acoustic spectrum data of the speech based at least on the plurality of feature vectors processed respectively by the second sub-model and the third sub-model; and updating parameters of the speech generation model based on the first loss function, the second loss function, the third loss function, and the fourth loss function.

In a third aspect of the present disclosure, a computer program product is provided. The computer program product is tangibly stored on a non-transitory computer-readable medium and includes machine-executable instructions. The machine-executable instructions, when executed by a machine, cause the machine to perform any steps of the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

As example embodiments of the present disclosure are described in more detail with reference to the accompanying drawings, the above and other objectives, features, and advantages of the present disclosure will become more apparent, and identical or similar reference numbers generally represent identical or similar components in the example embodiments of the present disclosure. In the accompanying drawings.

DETAILED DESCRIPTION

Principles of the present disclosure will be described below with reference to several example embodiments illustrated in the accompanying drawings.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "a set of embodiments." The term "another embodiment" indicates "a group of other embodiments." The terms "first," "second," and the like may refer to different or identical objects. Other explicit and implicit definitions may also be included below.

As mentioned above, conventional speech cloning techniques are usually based only on reference speech information and given text information. To generate more accurate and realistic speech data, the present disclosure provides a speech generation technique across multiple modalities. For example, multi-modal information of three modalities, i.e., two-dimensional reference image information (i.e., reference video information), audio information containing reference speech, and given text information, can be used to generate speech data that is more similar to speech of a real person who provides that reference speech. It should be understood that, in some embodiments, the given text information is used to control the content of speech data to be generated, the reference speech is used to control attributes such as timbre and pitch of the speech data to be generated, and the reference image information is used to control attributes such as mood and emotion of the speech data to be generated.

In view of this, embodiments of the present disclosure provide a solution for data processing. In this solution, a speech generation model can be trained. For example, a pre-trained multi-modal encoder may be used to determine a corresponding plurality of feature vectors based on image information, audio information, and text information in a training dataset. Further, these feature vectors may be input to a plurality of sub-models of the speech generation model. These sub-models may be used to predict duration of phonemes in speech, to predict pitch contour of the speech, to predict the sound volume of the speech, and to determine acoustic spectrum data of the speech, respectively. Loss functions of these sub-models are minimized through multiple trainings, and the speech generation model can be trained accordingly. Correlation of cross-modal information is achieved in this way, thereby optimizing the model training process. The model trained in this way can reconstruct more realistic speech data, thus optimizing the user experience.

Figure 1:
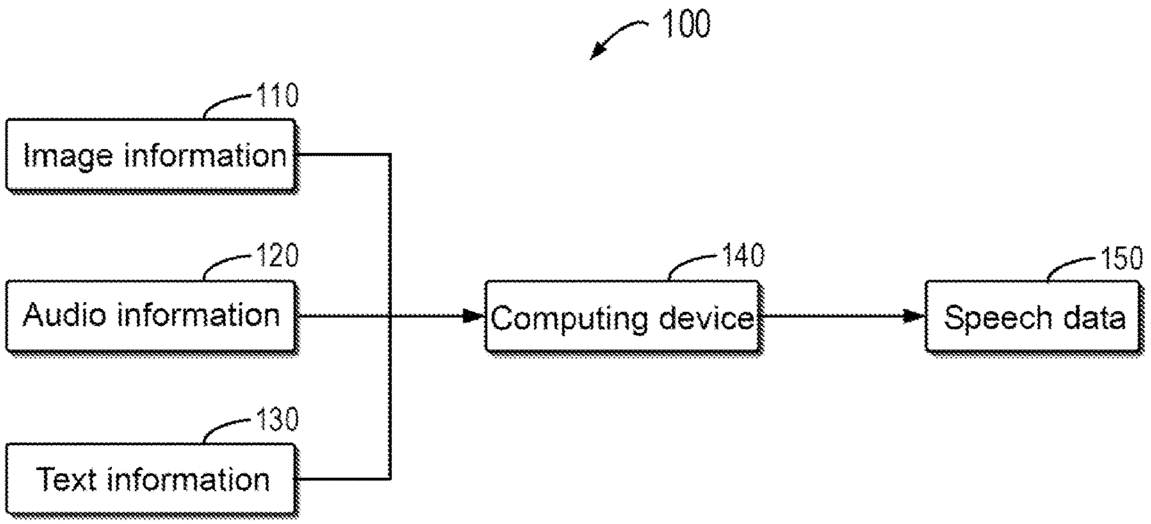
FIG. 1 is a schematic diagram of an example environment in which a plurality of embodiments of the present disclosure can be implemented.

Illustrative embodiments of the present disclosure will be specifically described below with reference to the accompanying drawings. FIG. 1 is a schematic diagram of example environment 100 in which a plurality of embodiments of the present disclosure can be implemented. As shown in FIG. 1, example environment 100 contains multi-modal information resources, e.g., image information 110, audio information 120, and text information 130. In some embodiments, image information 110 may be video information consisting of multiple frames of images, or may be mask information that does not contain images. Audio information 120 may be a speech fragment. Text information 130 may be at least one sign, character, or word in a text resource.

As shown in FIG. 1, example environment 100 may include computing device 140. Computing device 140 may be configured to receive image information 110 as a reference, audio information 120 containing a speech fragment of an operator, and given text information 130, and to generate speech data 150 by computing in accordance with the present disclosure. It should be understood that text information 130 defines the content of speech data 150, audio information 120 defines attributes of speech data 150 such as timbre and pitch, and image information 110 defines attributes of speech data 150 such as mood and emotion. As a result, the generated speech data 150 will be more similar to speech of a real person (who usually provides the speech fragment of an operator in audio information 120), and thus can be adapted to different operators, or even different contexts or scenarios.

In some embodiments, computing device 140 may include, but is not limited to, a personal computer, a server computer, a handheld or laptop device, a mobile device (such as a mobile phone, a personal digital assistant (PDA), and a media player), a consumer electronic product, a minicomputer, a mainframe computer, a cloud computing resource, and so on. It should be understood that, based on factors such as cost, computing device 140 may or may not have sufficient computing resources for model training.

In some embodiments, speech data 150 may be a speech fragment used to simulate the timbre and pitch of a conventional or specific operator and containing specific content.

It should be understood that the architecture and functions of example environment 100 are described for illustrative purposes only, without implying any limitation to the scope of the present disclosure. Embodiments of the present disclosure may also be applied to other environments having different structures and/or functions.

Figure 2:
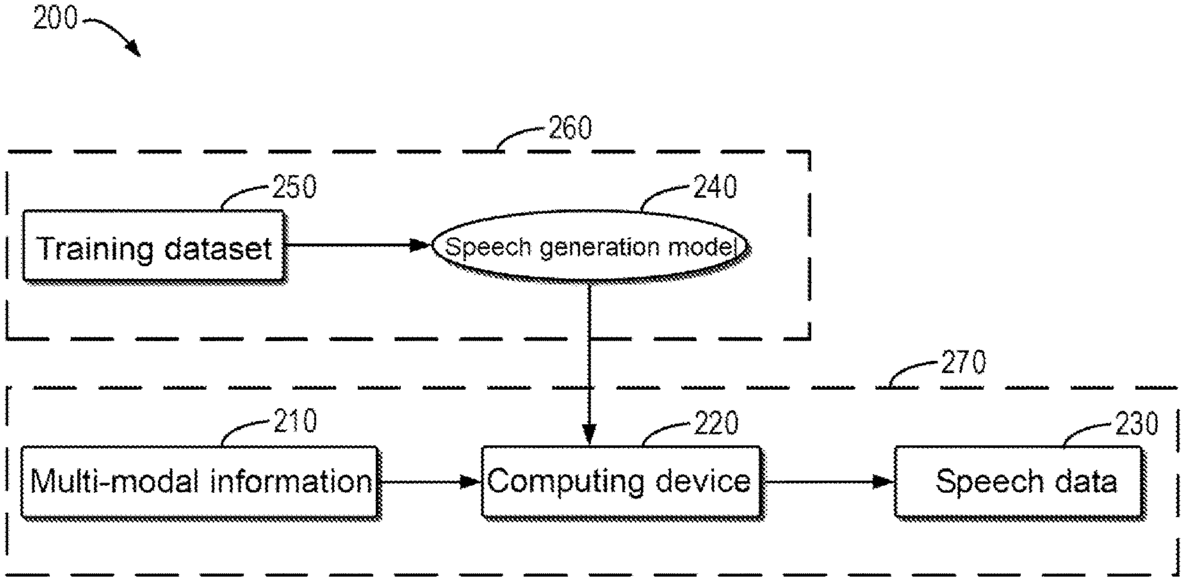
FIG. 2 illustrates a schematic diagram of a detailed example environment for training and applying a model according to an embodiment of the present disclosure.

In order to describe a training process of an image processing model in more detail, the training and application process of the model will be described below with reference to FIG. 2. FIG. 2 illustrates a schematic diagram of detailed example environment 200 for training and applying a model according to an embodiment of the present disclosure. As shown in FIG. 2, example environment 200 may generally include model training system 260 and model application system 270. As an example, model training system 260 and/or model application system 270 may be implemented in computing device 140 as shown in FIG. 1. It should be understood that the structure and functions of example environment 200 are described for illustrative purposes only, and are not intended to limit the scope of the subject matter described herein. The subject matter described herein may be implemented in different structures and/or functions.

As mentioned above, the process of reconstructing multi-modal information resources into speech data simulating a real person can be divided into two stages: a model training stage and a model application stage. As an example, in the model training stage, model training system 260 can use training dataset 250 to train speech generation model 240 used for performing corresponding functions. In the model application stage, model application system 270 may receive trained speech generation model 240. Thus, speech generation model 240 loaded into computing device 220 of model application system 270 can generate speech data 230 based on any input multi-modal information 210.

In other embodiments, speech generation model 240 may be constructed as a learning network. In some embodiments, this learning network may include multiple networks, wherein each of the networks may be a multilayer neural network that may be constituted by a large number of neurons. Through the training process, corresponding parameters of the neurons in each of the networks can be determined. Parameters of the neurons in these networks are collectively referred to as parameters of speech generation model 240.

The training process of speech generation model 240 may be performed in an iterative manner until at least part of the parameters of speech generation model 240 converge or until a predetermined number of iterations is performed, thereby obtaining final model parameters.

The technical solution described above is only used as an example, and does not limit the present invention. It should be understood that the networks may also be configured according to other manners and connection relationships. In order to explain the principle of the above solution more clearly, the process for training a model will be described in more detail below with reference to FIG. 3.

Figure 3:
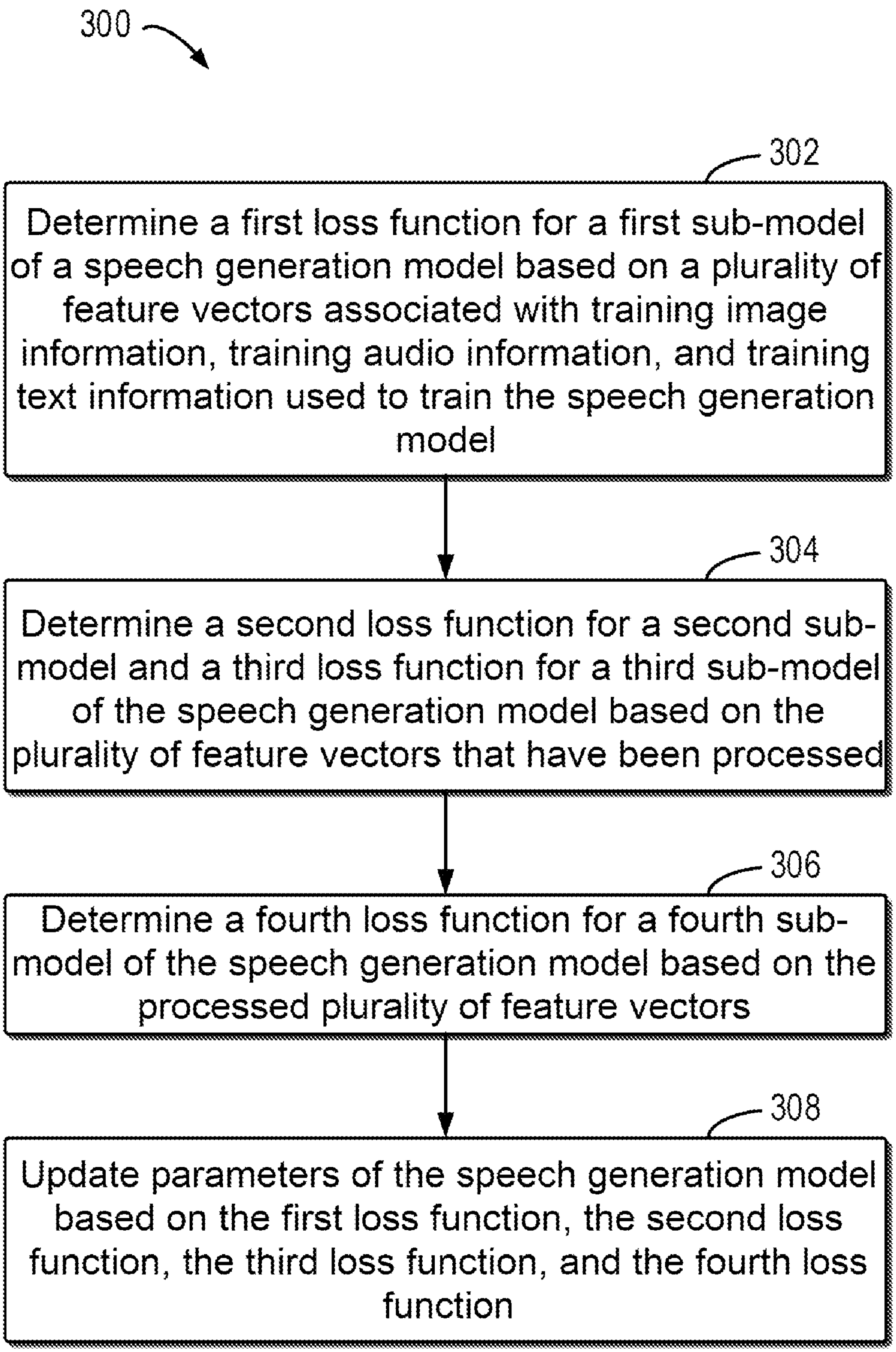
FIG. 3 illustrates a flow chart of a process for training a model according to an embodiment of the present disclosure.

FIG. 3 illustrates a flow chart of process 300 for training a model according to an embodiment of the present disclosure. In some embodiments, process 300 may be implemented in computing device 140 in FIG. 1 or other computing devices. Process 300 for training a model according to an embodiment of the present disclosure will now be described with reference to FIG. 3 in combination with FIG. 1. For ease of understanding, specific examples mentioned in the following description are all illustrative and are not intended to limit the protection scope of the present disclosure.

At 302, computing device 140 may determine a first loss function for a first sub-model of a speech generation model based on a plurality of feature vectors associated with training image information, training audio information, and training text information used to train the speech generation model. The first sub-model may be referred to as a duration prediction sub-model and is configured to process the plurality of feature vectors to predict the duration of phonemes in speech. In some embodiments, the first loss function is determined based on a comparison of the predicted duration with a truth value. As an example, computing device 140 may determine a loss function for the sub-model based on a difference between the predicted duration and a predetermined duration truth value as the first loss function.

At 304, computing device 140 may determine a second loss function for a second sub-model and a third loss function for a third sub-model of the speech generation model based on the plurality of feature vectors that have been processed. The second sub-model may be referred to as a pitch contour prediction sub-model, which may predict the pitch contour of the speech. The third sub-model may be referred to as a sound volume prediction sub-model, which may predict the sound volume of the speech. In some embodiments, the second loss function is determined based on a comparison of the predicted pitch contour with a pitch contour truth value, and the third loss function is determined based on a comparison of the predicted sound volume with a sound volume truth value.

At 306, computing device 140 may determine a fourth loss function for a fourth sub-model of the speech generation model based on the processed plurality of feature vectors. The fourth sub-model may be referred to as an acoustic spectrum data sub-model, which is configured to determine acoustic spectrum data of the speech based at least on the plurality of feature vectors processed respectively by the second sub-model and the third sub-model. In some embodiments, the fourth loss function is determined based on a comparison of the acoustic spectrum data determined by the fourth sub-model with an acoustic spectrum data truth value.

At 308, computing device 140 may update parameters of the speech generation model based on the first loss function, the second loss function, the third loss function, and the fourth loss function. As an example, parameters of the speech generation model can be updated by repetition training to minimize an overall loss function that integrates the first loss function, the second loss function, the third loss function, and the fourth loss function. Similar to a conventional model training method, computing device 140 may adjust parameters of each sub-model of the speech generation model based on the determined loss function values until the loss function values are minimized, and thus a convergent speech generation model can be obtained by training.

In some embodiments, computing device 140 may further extract a plurality of feature vectors associated with speech to be generated from the training image information, the training audio information, and the training text information using the trained multi-modal encoder. As an example, to extract the plurality of feature vectors, computing device 140 may determine corresponding image features, audio features, and text features based on the training image information, the training audio information, and the training text information, respectively.

In some embodiments, to determine the image features, audio features, and text features described above, computing device 140 may determine the image features using a pre-set video encoder based on the reference image information, determine the audio features using a pre-set audio encoder based on the reference audio information, and determine the text features using a pre-set text encoder based on the reference text information. As an example, Fast R_CNN can be used as the video encoder, wave2vec 2.0 can be used as the audio encoder, and Bidirectional Encoder Representations from Transformers (BERT) can be used as the text encoder to determine the image features, the audio features, and the text features, respectively.

In addition, to extract the plurality of feature vectors described above, computing device 140 may construct a feature tensor from the image features, audio features, and text features. In some embodiments, computing device 140 may arrange the determined image features, audio features, and text features along first, second, and third coordinates, respectively, to form a three-dimensional space. As an example, if the image features correspond to X sub-images, the audio features correspond to Y sub-audios, and the text features correspond to Z characters or words, then a three-dimensional feature tensor of $X \times Y \times Z$ can be constructed.

It should be understood that one position in the three-dimensional space corresponds to a combination of an image feature of the image features, a corresponding audio feature of the audio features, and a corresponding text feature of the text features. As an example, in the coordinate system of the above three-dimensional space, a coordinate (1, 1, 1) may correspond to a combination of a first image feature, a first audio feature, and a first text feature.

In addition, in order to construct the feature tensor, computing device 140 may also determine a value of a corresponding coordinate position based on pre-labeled associated information of the above-mentioned combination to form a part of the feature tensor. As an example, during the model training process, one or two features in a combination of specific image features, audio features, and text features may be replaced or masked, so that there is a mismatching situation among image features, audio features, and text features. Thus, various matching or non-matching situations can be assigned with values, which are associated information. For example, a situation where image features, audio features, and text features match can be determined as 1; a situation where image features and audio features match while text features mismatch can be determined as 2; a situation where image features and text features match while audio features mismatch can be determined as 3; a situation where audio features and text features match while image features mismatch can be determined as 4; and a situation where image features and audio features match while all of text features mismatch can be determined as 5. In this way, all the coordinates of the feature tensor can be filled with the corresponding associated information, so that the associated information between the modalities will be allowed for in the next training process. Since the masked image features are allowed for during training, the trained speech generation model can still generate realistic speech without the reference image information.

Further, to extract the plurality of feature vectors described above, the constructed feature tensor may be decomposed into a first feature vector, a second feature vector, and a third feature vector corresponding to the image features, audio features, and text features, respectively. In some embodiments, the CANDECOMP/PARAFAC decomposition (i.e., CP decomposition) algorithm may be specifically utilized to decompose the feature tensor into three feature vectors and noise. Thus, the first feature vector, the second feature vector, and the third feature vector can be obtained. The first feature vector, the second feature vector, and the third feature vector each include the associated information of the feature tensor which has been de-noised. It should be understood that the present disclosure is applicable to other decomposition algorithms that decompose a tensor into a specific number of vectors.

In some embodiments, a specific manner of determining loss function values of the multi-modal encoder may be that computing device 140 determines the loss function values of the model based on the first feature vector, the second feature vector, the third feature vector, and the corresponding image features, audio features, and text features. As an example, absolute values of differences between the first feature vector and the image features, between the second feature vector and the audio features, and between the third feature vector and the text features may be separately determined and summed.

Computing device 140 may update parameters of the multi-modal encoder based on the determined loss function values. Similar to a conventional model training method, computing device 140 may adjust parameters of the multi-modal encoder based on the determined loss function values until the loss function values are minimized, and thus a convergent speech generation model can be obtained by training.

In some application scenarios, computing device 140 may also apply reference image information, reference speech information, and text information to the trained speech generation model to determine acoustic spectrum data containing emotional information as determined by the reference image information, timbre information as determined by the reference speech information, and speech content as determined by the text information, and to generate speech based on the acoustic spectrum data.

In some embodiments, the reference image information may be a reference video containing multiple frames of reference images, or the reference image information may be a mask. When the reference image information is missing, the reference image information may be filled with a predetermined mask. Since the multi-modal encoder undergoes a modal masking process during pre-training, relatively realistic speech that contains more emotion-related information can still be generated.

In some embodiments, computing device 140 may generate, when receiving an inquiry message from a user, text information for responding to the inquiry message. As an example, computing device 140 serving as a chatbot may generate text containing corresponding answers upon receiving a question from a user, and may play artificially intelligent speech to the user with predetermined timbre and reasonable emotion based on the speech generation model in computing device 140. When it is determined that the text information cannot be generated (e.g., computing device 140 cannot obtain or generate a matching answer), computing device 140 may send a reminder message to an operator who provides the reference speech information. This allows for a seamless switch from artificially intelligent speech to realistic speech.

Figure 4:
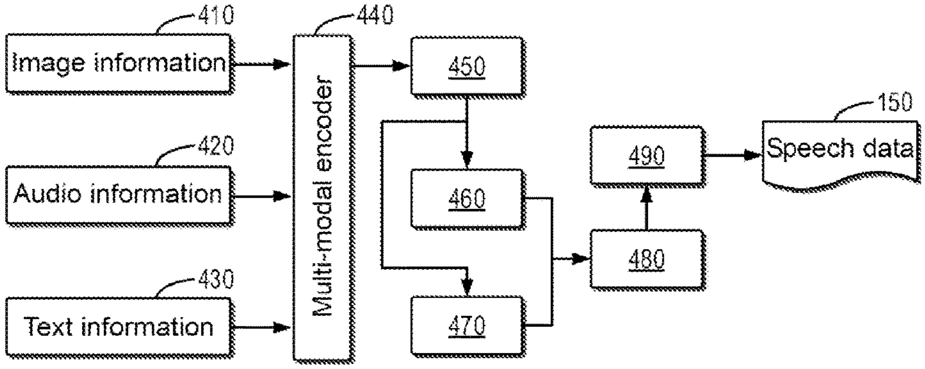
FIG. 4 illustrates a schematic diagram of an example environment of an overall architecture for generating speech data based on multi-modal information according to an embodiment of the present disclosure.

To more clearly illustrate an overall architecture of the present disclosure, FIG. 4 illustrates a schematic diagram of an example environment of an overall architecture for generating speech data based on multi-modal information according to an embodiment of the present disclosure. In FIG. 4, multi-modal encoder 440, duration prediction sub-model 450, pitch contour prediction sub-model 460, sound volume prediction sub-model 470, and acoustic spectrum data sub-model 480 together form the speech generation model of the present disclosure. Except for multi-modal encoder 440 that has been pre-trained, the other sub-models are all further trained to adjust the parameters of the models. In other words, in order to train the speech generation model, duration prediction sub-model 450, pitch contour prediction sub-model 460, sound volume prediction sub-model 470, and acoustic spectrum data sub-model 480 will be trained as a whole.

As an example, image information 410, audio information 420, and text information 430 are input to pre-trained multi-modal encoder 440 to generate a plurality of feature vectors, as shown in FIG. 4. A specific example of generating feature vectors will be described below with reference to FIG. 5. The generated plurality of feature vectors are first input to duration prediction sub-model 450. Duration prediction sub-model 450 is configured to process the plurality of feature vectors to predict the duration of phonemes in speech. It should be understood that the input to duration prediction sub-model 450 is a plurality of feature vectors output from multi-modal encoder 440, and the output from duration prediction sub-model 450 is a plurality of feature vectors in which the duration of each factor feature vector is adjusted. To reduce the mismatch between the input feature vectors and the length of acoustic spectrum frames, duration prediction sub-model 450 is optimized. For example, the Montreal Forced Alignment (MFA) tool may be used to acquire a sequence of phoneme durations as a truth value, and then a loss function, e.g., mean square error (MSE), of the duration truth value and the predicted duration is calculated. Further, the duration of each factor feature vector of the plurality of feature vectors is adjusted by minimizing the loss function.

The adjusted plurality of feature vectors are then input to pitch contour prediction sub-model 460 and sound volume prediction sub-model 470, respectively. Pitch contour prediction sub-model 460 is configured to process the input plurality of feature vectors to predict the pitch contour of the speech. It should be understood that the input to pitch contour prediction sub-model 460 is a plurality of feature vectors output from duration prediction sub-model 450, and the output from pitch contour prediction sub-model 460 is a plurality of feature vectors with pitch contour adjusted. As an example, a continuous piece of pitch may be converted to a pitch spectrum using continuous wavelet transform (CWT), the pitch spectrum may be used as a truth value, and then a loss function, e.g., mean square error (MSE), of the truth value and the pitch contour predicted by pitch contour prediction sub-model 460 is calculated. Furthermore, the pitch contour of each factor feature vector of the plurality of feature vectors is adjusted by minimizing the loss function.

In addition, sound volume prediction sub-model 470 is configured to process the input plurality of feature vectors to predict the sound volume of the speech. It should be understood that the input to sound volume prediction sub-model 470 is a plurality of feature vectors output from duration prediction sub-model 450, and the output from sound volume prediction sub-model 470 is a plurality of feature vectors with adjusted sound volume. As an example, the L2-norm of amplitude of each short-time Fourier transform (STFT) frame may be calculated and used as an energy truth value, and then a loss function, e.g., mean square error (MSE), of that truth value and the sound volume predicted by sound volume prediction sub-model 470 is calculated. Further, the sound volume of each factor feature vector of the plurality of feature vectors is adjusted by minimizing the loss function.

Then, the plurality of feature vectors that undergo pitch contour prediction sub-model 460 and sound volume prediction sub-model 470, respectively are input to acoustic spectrum data sub-model 480. For example, the feature vectors from pitch contour prediction sub-model 460 and sound volume prediction sub-model 470 can be encoded into acoustic spectrum data sub-model 480 through two or other numbers of neural network layers. Similarly, acoustic spectrum data sub-model 480 is optimized by minimizing the loss function so as to generate desired acoustic spectrum data.

In order to convert the acoustic spectrum data (e.g., Mel spectrogram) generated by acoustic spectrum data sub-model 480 into time-domain waves, HiFi-GAN can be used as a vocoder, and the HiFi-GAN is mainly concerned with generating an original waveform from the Mel spectrogram by GAN. The HiFi-GAN is illustratively implemented at 490, to produce speech data 150 as shown in the figure. A generator of HiFi-GAN may be divided into two main modules: a transposed convolution (ConvTranspose) network and a multi-receptive field fusion (MRF) module. Specifically, the Mel spectrogram may first be upsampled by the transposed convolution network, aiming to align the length of output features with the temporal resolution of an original waveform. The upsampled features can then be input to the MRF module consisting of a plurality of residual blocks, and the sum of outputs of these blocks is used as a predicted waveform. Here, the setting of using residual blocks with different kernel sizes and expansion rates is followed to ensure different receptive fields. Further, the vocoder can be optimized by an objective function containing LSGAN-based loss, Mel spectrogram loss, and feature matching loss.

Figure 5:
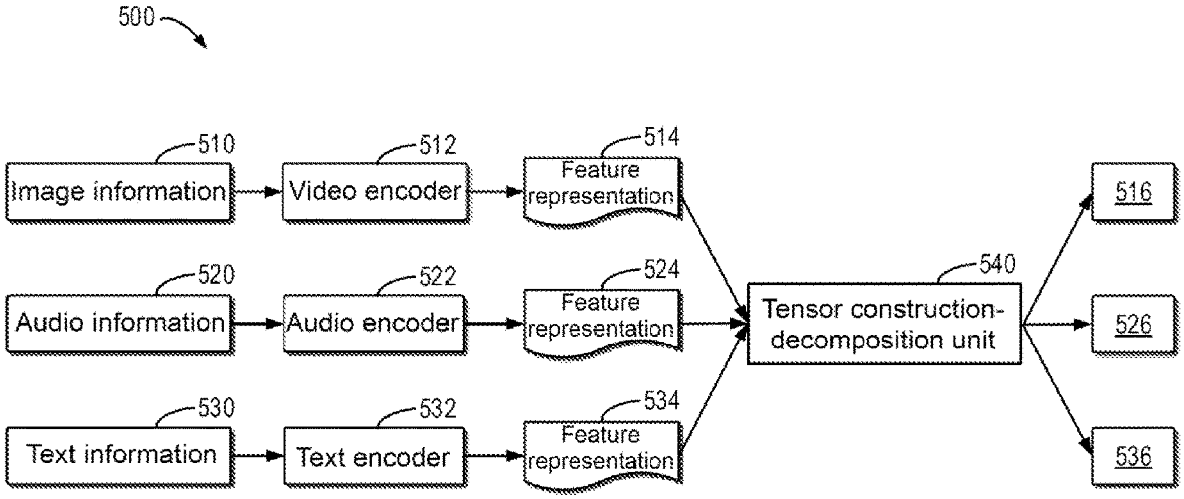
FIG. 5 illustrates a schematic diagram of an example environment in which a plurality of feature vectors are extracted from multi-modal information according to an embodiment of the present disclosure.

In order to explain embodiments of the present disclosure in more detail, the process of constructing a feature tensor and decomposing a feature tensor in multi-modal encoder 440 will now be described in detail with reference to FIG. 5. FIG. 5 illustrates a schematic diagram of example process 500 for constructing and decomposing a tensor according to an embodiment of the present disclosure.

As shown in FIG. 5, after image information 510, audio information 520, and text information 530 are input to a computing device for training a model, video encoder 512 in the computing device will process image information 510 to obtain corresponding feature representation 514. Similarly and concurrently, audio encoder 522 in the computing device will process audio information 520 to obtain corresponding feature representation 524. Text encoder 532 in the computing device will process text information 530 to obtain corresponding feature representation 534. As an example, video encoder 512 may be R_CNN, audio encoder 522 may be wave2vec 2.0, and text encoder 532 may be BERT.

Tensor construction-decomposition unit 540 first constructs feature representation 514, feature representation 524, and feature representation 534 into a feature tensor. As an example, tensor construction-decomposition unit 540 may construct a three-dimensional feature tensor of $X \times Y \times Z$ from image features corresponding to X sub-images, audio features corresponding to Y sub-audios, and text features corresponding to Z characters or words.

After that, tensor construction-decomposition unit 540 may use any tensor decomposition algorithm to decompose the above three-dimensional feature tensor into first feature vector 516, second feature vector 526, third feature vector 536, and noise. In this way, de-noised vector representations can be obtained.

Through the above processing, de-noised first feature vector 516, second feature vector 526, and third feature vector 536 can be obtained. Therefore, the loss function values of the model can be more accurately determined based on first feature vector 516, second feature vector 526, third feature vector 536, feature representation 514, feature representation 524, and feature representation 534, thereby optimizing the model training process.

Through the above-described embodiments, the present disclosure provides a novel framework for a multi-modal-based speech generation model, which integrates modalities of sound, image, and text during model training. Since masking is used during training of the multi-modal encoder in the present disclosure, the speech generated by the model can still have an appropriate emotional representation even if the speech generation model is applied without the input of image information. In addition, the present disclosure improves a cross-modal pre-training framework using the tensor decomposition algorithm, so that the model training allows for more information (e.g., associated information between modalities) while excluding noise information. Thus, the model training method of the present disclosure improves the model training efficiency and accuracy, and the trained model can reconstruct more realistic speech, thereby optimizing the user experience.

Figure 6:
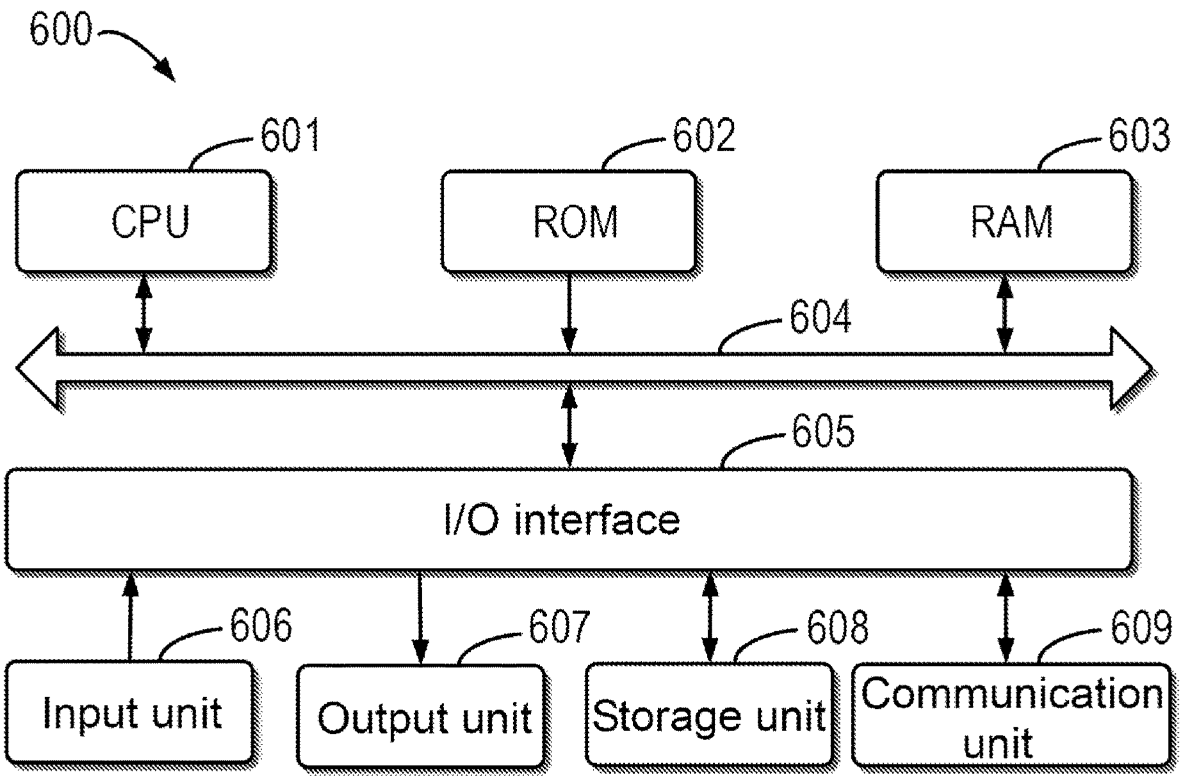
FIG. 6 illustrates a block diagram of a computing device that can implement a plurality of embodiments of the present disclosure.

FIG. 6 illustrates a block diagram of device 600 that can implement a plurality of embodiments of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing devices, cellular telephones, smartphones, wearable devices, and other similar computing devices. Components shown herein, their connections and relationships, and their functions are only used as examples and are not intended to limit the implementations of the present disclosure described and/or claimed herein.

As shown in FIG. 6, device 600 includes computing unit 601 that may perform various appropriate actions and processing according to a computer program stored in read-only memory (ROM) 602 or a computer program loaded from storage unit 608 to random access memory (RAM) 603. Various programs and data required for the operation of device 600 may also be stored in RAM 603. Computing unit 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

Computing unit 601 may be various general-purpose and/or special-purpose processing components with processing and computing capabilities. Some examples of computing unit 601 include, but are not limited to, a central processing unit (CPU), a graphics processing unit (GPU), various specialized artificial intelligence (AI) computing chips, various computing units for running machine learning model algorithms, a digital signal processor (DSP), and any appropriate processor, controller, microcontroller, and the like. Computing unit 601 performs the various methods and processing described above, such as processes 300 and 500. For example, in some embodiments, processes 300 and 500 may be implemented as a computer software program that is tangibly included in a machine-readable medium, for example, storage unit 608. In some embodiments, part of or all the computer program may be loaded and/or installed onto device 600 via ROM 602 and/or communication unit 609. When the computer program is loaded to RAM 603 and executed by computing unit 601, one or more steps of processes 300 and 500 described above may be performed. Alternatively, in other embodiments, computing unit 601 may also be configured to implement processes 300 and 500 in any other suitable manners (such as by means of firmware).

Various implementations of the systems and techniques described herein above may be implemented in a digital electronic circuit system, an integrated circuit system, a field programmable gate array (FPGA), an application specific integrated circuit (ASIC), an application specific standard product (ASSP), a system on a chip (SOC), a load programmable logic device (CPLD), computer hardware, firmware, software, and/or combinations thereof. These implementations may include: the implementations are performed in one or more computer programs which can be executed and/or interpreted on a programmable system including at least one programmable processor, and the programmable processor can be a special-purpose or general-purpose programmable processor, which can receive data and instructions from a storage system, at least one input device, and at least one output device, and transmit the data and instructions to the storage system, the at least one input device, and the at least one output device.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code can be completely executed on a machine, partially executed on a machine, partially executed on a machine and partially executed on a remote machine as an independent software package, or completely executed on a remote machine or a server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof.

To provide interaction with a user, the systems and techniques described herein can be implemented on a computer having: a display device (for example, a cathode ray tube (CRT) or liquid crystal display (LCD) monitor) for displaying information to a user; and a keyboard and a pointing device (for example, a mouse or a trackball) through which a user can provide input to the computer. Other kinds of devices may also be used to provide interaction with the user; for example, the feedback provided to the user may be any form of sensory feedback (e.g., visual feedback, auditory feedback, or tactile feedback); and additionally, input from the user may be received in any form (including acoustic input, voice input, or tactile input).

The systems and techniques described herein can be implemented on a computing system that includes back-end components (e.g., as a data server), or a computing system that includes middleware components (e.g., an application server), or a computing system that includes front-end components (e.g., a user computer having a graphical user interface or a web browser through which a user can interact with implementations of the systems and techniques described herein), or a computing system including any combination of such backend components, middleware components, or front-end components. The components of the system may be mutually connected through digital data communication (for example, a communication network) through any form or medium. An example of the communication network includes: a local area network (LAN), a wide area network (WAN), and the Internet.

The computer system may include a client terminal and a server. The client terminal and the server are generally remote from each other and usually interact through a communication network. A relationship between the client terminal and the server is generated by computer programs that run on corresponding computers and have a client terminal-server relationship with each other.

It should be understood that steps may be reordered, added, or deleted using the various forms of processes shown above. For example, the steps referred to in the present disclosure may be performed in parallel, may be performed sequentially, or may be performed in different orders as long as desired results of the technical solution disclosed by the present disclosure are achieved, and there is no restriction herein.

The above specific implementations do not constitute a limitation to the protection scope of the present disclosure. It will be apparent to those skilled in the art that various modifications, combinations, sub-combinations, and substitutions may be performed according to design requirements and other factors. Any modifications, equivalent replacements, and improvements made within the spirit and principles of the present disclosure shall be included in the scope of protection of the present disclosure.

What is claimed is:

1. A method for data processing, comprising:

determining a first loss function for a first sub-model of a speech generation model based on a plurality of feature vectors associated with training image information, training audio information, and training text information used to train the speech generation model, the speech generation model comprising a multi-modal encoder configured to receive the training image information, the training audio information and the training text information, and to generate the plurality of feature vectors therefrom, wherein generating the plurality of feature vectors in the multi-modal encoder comprises generating the plurality of feature vectors at least in part in the form of a tensor characterizing a multi-dimensional space in which a given position in the multi-dimensional space is encoded with a particular one of a plurality of values each indicating a different matching type between corresponding image, audio and text features of the given position;

the first sub-model having an input coupled to an output of the multi-modal encoder and being configured to process the plurality of feature vectors to predict duration of phonemes in speech;

determining a second loss function for a second sub-model and a third loss function for a third sub-model of the speech generation model based on the plurality of feature vectors that have been processed, the second sub-model and the third sub-model each having an input coupled to an output of the first sub-model, the second sub-model and the third sub-model being configured to process the plurality of feature vectors processed by the first sub-model to predict pitch contour and sound volume of the speech, respectively;

determining a fourth loss function for a fourth sub-model of the speech generation model based on the processed plurality of feature vectors, the fourth sub-model having an input coupled to respective outputs of the second and third sub-models, the fourth sub-model being configured to determine acoustic spectrum data of the speech based at least on the plurality of feature vectors processed respectively by the second sub-model and the third sub-model; and updating parameters of the speech generation model based on an overall loss function that combines the first loss function, the second loss function, the third loss function, and the fourth loss function.

2. The method according to claim 1, further comprising:

extracting the plurality of feature vectors associated with the speech from the training image information, the training audio information, and the training text information using the multi-modal encoder.

3. The method according to claim 2, wherein extracting the plurality of feature vectors comprises:

determining corresponding image features, audio features, and text features based on the training image information, the training audio information, and the training text information, respectively;

constructing a feature tensor from the image features, the audio features, and the text features; and decomposing the feature tensor into a first feature vector, a second feature vector, and a third feature vector corresponding to the image features, the audio features, and the text features, respectively.

4. The method according to claim 3, wherein constructing the feature tensor comprises:

arranging the image features, the audio features, and the text features respectively along a first coordinate, a second coordinate, and a third coordinate to form a three-dimensional space, one position in the three-dimensional space corresponding to a combination of an image feature of the image features, a corresponding audio feature of the audio features, and a corresponding text feature of the text features; and determining a value of the position based on pre-labeled associated information of the combination to form a part of the feature tensor.

5. The method according to claim 4, wherein the first feature vector, the second feature vector, and the third feature vector each comprise the associated information of the feature tensor which has been de-noised.

6. The method according to claim 1, wherein the first loss function is determined based on a comparison of the predicted duration with a truth value, the second loss function is determined based on a comparison of the predicted pitch contour with a pitch contour truth value, the third loss function is determined based on a comparison of the predicted sound volume with a sound volume truth value, and the fourth loss function is determined based on a comparison of the determined acoustic spectrum data with an acoustic spectrum data truth value.

7. The method according to claim 1, further comprising:

applying reference image information, reference speech information, and text information to the trained speech generation model to determine acoustic spectrum data containing emotional information as determined by the reference image information, timbre information as determined by the reference speech information, and speech content as determined by the text information; and generating the speech based on the acoustic spectrum data.

8. The method according to claim 7, wherein the reference image information is a reference video containing multiple frames of reference images, or the reference image information is a mask.

9. The method according to claim 7, further comprising:

generating, in response to receiving an inquiry message from a user, the text information for responding to the inquiry message; and sending, in response to a determination that the text information cannot be generated, a reminder message to an operator who provides the reference speech information.

10. An electronic device, comprising:

at least one processor; and memory coupled to the at least one processor and having instructions stored therein, wherein the instructions, when executed by the at least one processor, cause the electronic device to perform actions comprising:

determining a first loss function for a first sub-model of a speech generation model based on a plurality of feature vectors associated with training image information, training audio information, and training text information used to train the speech generation model, the speech generation model comprising a multi-modal encoder configured to receive the training image information, the training audio information and the training text information, and to generate the plurality of feature vectors therefrom, wherein generating the plurality of feature vectors in the multi-modal encoder comprises generating the plurality of feature vectors at least in part in the form of a tensor characterizing a multi-dimensional space in which a given position in the multi-dimensional space is encoded with a particular one of a plurality of values each indicating a different matching type between corresponding image, audio and text features of the given position;

the first sub-model having an input coupled to an output of the multi-modal encoder and being configured to process the plurality of feature vectors to predict duration of phonemes in speech;

determining a second loss function for a second sub-model and a third loss function for a third sub-model of the speech generation model based on the plurality of feature vectors that have been processed, the second sub-model and the third sub-model each having an input coupled to an output of the first sub-model, the second sub-model and the third sub-model being configured to process the plurality of feature vectors processed by the first sub-model to predict pitch contour and sound volume of the speech, respectively;

determining a fourth loss function for a fourth sub-model of the speech generation model based on the processed plurality of feature vectors, the fourth sub-model having an input coupled to respective outputs of the second and third sub-models, the fourth sub-model being configured to determine acoustic spectrum data of the speech based at least on the plurality of feature vectors processed respectively by the second sub-model and the third sub-model; and updating parameters of the speech generation model based on an overall loss function that combines the first loss function, the second loss function, the third loss function, and the fourth loss function.

11. The electronic device according to claim 10, further comprising:

extracting the plurality of feature vectors associated with the speech from the training image information, the training audio information, and the training text information using the multi-modal encoder.

12. The electronic device according to claim 11, wherein extracting the plurality of feature vectors comprises:

determining corresponding image features, audio features, and text features based on the training image information, the training audio information, and the training text information, respectively;

constructing a feature tensor from the image features, the audio features, and the text features; and decomposing the feature tensor into a first feature vector, a second feature vector, and a third feature vector corresponding to the image features, the audio features, and the text features, respectively.

13. The electronic device according to claim 12, wherein constructing the feature tensor comprises:

arranging the image features, the audio features, and the text features respectively along a first coordinate, a second coordinate, and a third coordinate to form a three-dimensional space, one position in the three-dimensional space corresponding to a combination of an image feature of the image features, a corresponding audio feature of the audio features, and a corresponding text feature of the text features; and determining a value of the position based on pre-labeled associated information of the combination to form a part of the feature tensor.

14. The electronic device according to claim 13, wherein the first feature vector, the second feature vector, and the third feature vector each comprise the associated information of the feature tensor which has been de-noised.

15. The electronic device according to claim 10, wherein the first loss function is determined based on a comparison of the predicted duration with a truth value, the second loss function is determined based on a comparison of the predicted pitch contour with a pitch contour truth value, the third loss function is determined based on a comparison of the predicted sound volume with a sound volume truth value, and the fourth loss function is determined based on a comparison of the determined acoustic spectrum data with an acoustic spectrum data truth value.

16. The electronic device according to claim 10, further comprising:

applying reference image information, reference speech information, and text information to the trained speech generation model to determine acoustic spectrum data containing emotional information as determined by the reference image information, timbre information as determined by the reference speech information, and speech content as determined by the text information; and generating the speech based on the acoustic spectrum data.

17. The electronic device according to claim 16, wherein the reference image information is a reference video containing multiple frames of reference images, or the reference image information is a mask.

18. The electronic device according to claim 16, further comprising:

generating, in response to receiving an inquiry message from a user, the text information for responding to the inquiry message; and sending, in response to a determination that the text information cannot be generated, a reminder message to an operator who provides the reference speech information.

19. A computer program product that is tangibly stored on a non-transitory computer-readable medium and comprises machine-executable instructions, wherein the machine-executable instructions, when executed by a machine, cause the machine to perform actions comprising:

determining a first loss function for a first sub-model of a speech generation model based on a plurality of feature vectors associated with training image information, training audio information, and training text information used to train the speech generation model, the speech generation model comprising a multi-modal encoder configured to receive the training image information, the training audio information and the training text information, and to generate the plurality of feature vectors therefrom, wherein generating the plurality of feature vectors in the multi-modal encoder comprises generating the plurality of feature vectors at least in part in the form of a tensor characterizing a multi-dimensional space in which a given position in the multi-dimensional space is encoded with a particular one of a plurality of values each indicating a different matching type between corresponding image, audio and text features of the given position;

the first sub-model having an input coupled to an output of the multi-modal encoder and being configured to process the plurality of feature vectors to predict duration of phonemes in speech;

determining a second loss function for a second sub-model and a third loss function for a third sub-model of the speech generation model based on the plurality of feature vectors that have been processed, the second sub-model and the third sub-model each having an input coupled to an output of the first sub-model, the second sub-model and the third sub-model being configured to process the plurality of feature vectors processed by the first sub-model to predict pitch contour and sound volume of the speech, respectively;

determining a fourth loss function for a fourth sub-model of the speech generation model based on the processed plurality of feature vectors, the fourth sub-model having an input coupled to respective outputs of the second and third sub-models, the fourth sub-model being configured to determine acoustic spectrum data of the speech based at least on the plurality of feature vectors processed respectively by the second sub-model and the third sub-model; and updating parameters of the speech generation model based on an overall loss function that combines the first loss function, the second loss function, the third loss function, and the fourth loss function.

20. The computer program product according to claim 19, wherein the actions further comprise:

extracting the plurality of feature vectors associated with the speech from the training image information, the training audio information, and the training text information using the multi-modal encoder.

* * * * *